(12) United States Patent
Shirota et al.

(10) Patent No.: US 6,474,803 B1
(45) Date of Patent: Nov. 5, 2002

(54) INK, INK SET, INK CARTRIDGE, RECORDING UNIT, IMAGE RECORDING METHOD AND IMAGE RECORDING APPARATUS

(75) Inventors: Koromo Shirota, Kawasaki (JP); Shoji Koike, Yokohama (JP); Shinichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/260,489

(22) Filed: Mar. 2, 1999

(30) Foreign Application Priority Data

Mar. 3, 1998 (JP) ............................. 10-050512

(51) Int. Cl.$^7$ .................................................. B41J 2/01
(52) U.S. Cl. ................................. 347/100; 347/96
(58) Field of Search .................... 347/100, 106, 347/101, 95, 96; 106/31.58

(56) References Cited

U.S. PATENT DOCUMENTS 5,540,764 A * 7/1996 Haruta et al. ............... 347/100
5,734,403 A * 3/1998 Suga et al. .................. 347/101
5,764,261 A   6/1998 Koike et al. ................ 347/100
5,782,967 A * 7/1998 Shirota et al. ............ 106/31.58
5,928,388 A * 7/1999 Leaver ........................... 8/638
5,997,124 A * 12/1999 Capps et al. .................. 347/14
5,997,623 A * 12/1999 Lin ............................ 106/31.58
6,036,307 A * 3/2000 Hakamada et al. ......... 347/100

FOREIGN PATENT DOCUMENTS

| EP | 0 769 536 A2 | 4/1997 | |
| EP | 0 779 344 A1 | 6/1997 | |
| JP | 54-059936 | 5/1979 | |
| JP | 06-271798 | 9/1994 | |
| JP | 08-127981 | 5/1996 | |
| JP | 10095107 | * 4/1998 | ............... B41J/2/01 |

* cited by examiner

Primary Examiner—John Barlow
Assistant Examiner—Manish S. Shah
(74) Attorney, Agent, or Firm—Fitzpatrick, Cella, Harper & Scinto

(57) ABSTRACT

Ink which can be rarely not discharged from an orifice after a pause of recording in diversified environments for use or even when a diameter of the orifice is reduced.

This ink contains water-soluble coloring material, bis-hydroxyethyl sulfone and urea in an aqueous solvent.

3 Claims, 4 Drawing Sheets

INK, INK SET, INK CARTRIDGE, RECORDING UNIT, IMAGE RECORDING METHOD AND IMAGE RECORDING APPARATUS

BACKGROUND OF THE INVENTION

1. Field of the Invention

The present invention relates to an ink preferably usable for ink-jet recording which records on recording material while discharging ink drops from orifices in response to recording signals as well as an ink set, an ink cartridge, a recording unit, an image recording apparatus and an image recording method which use the ink.

2. Related Background Art

There has conventionally been reported or proposed inks having various compositions as those which are used for ink-jet recording. In the recent years in particular, inks have been studied and examined in details in various aspects such as compositions and physical properties thereof in order to perform favorable recording on plain paper such as copying paper, reporting paper, notebooks, letter paper or the like which are generally used in offices as well as cloths.

Also for ink-jet recording method, there have been proposed various modes including one which continuously produces electrically charged liquid drops and uses a portion of the liquid drops for recording, another which transmits signals to a recording head having a piezoelectric element and performs recording by discharging recording liquid in response to the signals, and still another which provides heat energy corresponding to recording signals to the recording liquid contained in a chamber in a recording head and performs recording by discharging the recording liquid. For example, Japanese Patent Application Laid-Open No. 54-59936 discloses an ink-jet recording method in which an ink is discharged by utilizing ink bubbling phenomenon caused by heat energy. The method facilitates to highly integrate openings through which the ink is discharged (hereinafter referred to as orifices) or to arrange the orifices at a high density, and thereby it is adopted as one of main current ink-jet recording methods. As one of preferable characteristics for the ink for the ink-jet recording, there can be mentioned a characteristic to prevent, as far as possible, the orifices from clogging, which may cause improper ink discharge or non-discharge of the ink when recording is restarted after interruption of the recording.

As a current trend regarding an ink jet recording method, intensive reserch and development are being conducted to achieve much smaller diameter of orifices in order to meet a demand for a higher quality images. In addition, as ink-jet recording apparatus prevails, environments for use thereof are being diversified. On the basis of researches so far made, the inventors of the present invention recognized that it was important to adapt the aforementioned ink characteristics for the trend and the diversification for more stable ink-jet recording.

On the basis of this recognition, the inventors repeatedly examined ink containing water-soluble coloring materials (for example, an ink which contains a water-soluble coloring material and a water-soluble organic solvent such as glycol, that is, an ink which is mainly used currently as ink composition and has compositions containing water-soluble coloring materials). As a result, the inventors found that the ink can be hardly discharged or tends to cause inaccurate redischarge phenomena (for example, a phenomenon to deviate ink attaining points or a phenomenon to splash ink) after recording interruption when, for example, temperature is low or diameters of orifices are smaller. Though a reason for this tendency is not clarified, the examination so far made provided results that components such as water which have relatively low vapor pressures of the aqueous ink are vaporized through the orifices from the aqueous ink contained in the orifices, whereby concentration of the components such as water-soluble organic solvents which have relatively high vapor pressures rises in the ink contained in the orifices, and in case that the water-soluble coloring material has higher affinity with an organic solvent than that of water, it is presumed that concentration of the coloring material in the aqueous ink contained in the orifices becomes higher than expected concentration resulting from the vaporization of water or the like, whereby a viscosity of the ink contained in the orifices becomes higher than a level anticipated by those skilled in the art. It is considered that the unexpected rise in concentration of the coloring material makes difficulty in the ink redischargeability conspicuous when the head placed in a low temperature environment in which a viscosity of the ink is further enhanced or on the recording head provided with smaller whose orifices discharging force is relatively weakened.

SUMMARY OF THE INVENTION

An object of the present invention is therefore to provide an ink which can rarely be not redischarged from orifices after a pause of recording even in diversified environment for use or even when diameters of orifices are further reduced.

Another object of the present invention is to provide an image recording method which is capable of stably forming high quality images even in diversified environments for use or stably exhibiting its effect even when diameters of orifices are finely reduced to enhance qualities of recorded images.

A further object of the present invention is to provide an image forming apparatus which is capable of stably recording high quality images even in diversified environments for use or stably exhibiting its effect even when diameters of orifices are finely reduced to enhance qualities of images as well as an ink cartridge, an ink set and a recording unit which are usable with the image forming apparatus.

According to a first aspect of the present invention, there is provided an ink containing a water-soluble coloring material and an aqueous solvent, wherein the ink further contains bis-hydroxyethyl sulfon and wrea.

According to further aspect of the present invention, there is provided an image recording method comprising a step of imparting an ink to an image forming region of a recording medium, wherein the ink contains a water-soluble coloring material, bis-hydroxyethyl sulfone and urea in an aqueous solvent.

According to further aspect of the present invention, there is provided an image recording apparatus comprising a recording unit which comprises an ink housing section containing an ink, means for imparting the ink to a recording medium, means for supplying said ink to said means, and means for operating the means for imparting the recording ink to the recording medium in response to record signal wherein the ink contains a water-soluble coloring material, bis-hydroxyethyl sulfone and urea in an aqueous solvent.

According to further aspect of the present invention, there is provided an ink set comprising a combination of a first ink containing a first water-soluble coloring material, bis-hydroxyethyl sulfone and urea in an aqueous solution, and a second ink containing a second coloring material, wherein the first and second coloring materials have colors which are selected from the group consisting of yellow, magenta, cyan, black, red, blue and green.

According to further aspect of the present invention, there is provided an ink cartridge comprising an ink housing section containing an ink, wherein said ink contains a water-soluble coloring material, bis-hydroxyethyl sulfone and urea in an aqueous solvent.

According to further aspect of the present invention, there is provided a recording unit comprising an ink housing section containing an ink, means for imparting an ink to a recording medium and means for supplying the ink to the means for imparting an ink to a recording medium wherein the ink contains a water-soluble coloring material, bis-hydroxyethyl sulfone and urea in an aqueous solvent.

According to these embodiments of the present invention, it is possible to stabilize redischargeability of the aqueous ink containing a water-soluble coloring material in diversified recording environments even when diameters of orifices are finely reduced.

According to further aspect of the present invention, there is provided an image recording method comprising the steps of: providing an image recording apparatus comprising a) a recording unit provided with i) an ink housing section containing an ink, ii) a recording head for ejecting the ink from an orifice to a recording medium, and iii) means for supplying the ink from the ink housing section to the recording head; and b) means for operating the recording head to eject the ink to a recording medium in response to a recording signal; and operating the image recording apparatus, discharging the ink from an orifice and adhering the ink to an image recording region on a recording medium, wherein the ink contains a water-soluble coloring material, bis-hydroxyethyl sulfone and urea in an aqueous medium, and wherein the orifice has a size capable of ejecting 0.1 to 40 picoliters of an ink with one ejection operation.

This embodiment makes it possible to stably record highly minute images.

According to further aspect of the present invention, there is provided an image recording apparatus comprising: a) a recording unit provided with i) an ink housing section containing an ink, ii) a recording head for ejecting an ink from an orifice to a recording medium, and iii) means for supplying the ink in the ink housing section to the recording head; and b) means for allowing the recording unit to eject the ink in response to a recording signal, wherein the ink contains a water-soluble coloring material, bis-hydroxyethyl sulfone and urea in an aqueous medium, and the orifice has a size capable of ejecting 0.1 to 40 picoliters of an ink with one ejection operation.

According to still further aspect of the present invention, there is provided a recording unit comprising an ink housing section containing an ink which contains a water-soluble coloring material, bis-hydroxyethyl sulfone and urea in an aqueous solvent, a recording head for discharging the recording ink from an orifice to a recording medium, and means for supplying the ink in the ink housing section for the recording head: the orifice has a size capable of discharging 0.1 to 40 picoliters of ink with a single discharging operation.

These embodiments makes it possible to stable recording of an image having a remarkably high quality.

Though a reason that each of the objects of the present invention can be accomplished by adopting each of the embodiments described above is not clear, it is considered that bis-hydroxyethyl sulfone is a solid at normal temperature and tends to be separated in a wax like condition when it is contained in the aqueous medium at a ratio exceeding 80 wt %, whereby this phenomenon occurs microscopically also in the ink contained in orifices as water is vaporized. Further, urea remarkably enhances an affinity between water and a water-soluble dye, thus, it is considered that coexistence of bis-hydroxyethyl sulfone and urea multiplies an effect to suppress vaporization of water in ink from the orifices due to separation of BHES in the ink contained in the orifices by an effect to suppress abrupt enhancement of a dye concentration in ink in the vicinities of the orifices.

Japanese Patent Application Laid-Open No. 6-271798 discloses an ink containing bis-hydroxyethyl sulfone, and discloses that bleeding and slow drying characteristic of the ink on recording media (for example, papers, cloths or the like) are improved when an ink-jet recording is conducted by using the ink. Further the ink is said to have enhanced ejection stability. However, this patent is devoid of any disclosure about the technical problems described above, and the present invention does not teach or suggest the effect obtainable with the ink of the present invention.

Furthermore, Japanese Patent Application Laid-Open No. 8-127981 discloses ink for textile printing by an ink jet method which contains a dispersed dye and an aqueous medium and to which bis-hydroxyethyl sulfone and a derivative thereof are added. In addition, it is described that urea may be added. Above-mentioned technical problem is not disclosed, however, this patent also makes no reference even to the technical problems described above not to speak of the ink according to the present invention nor suggests the effect obtainable with the ink.

DETAILED DESCRIPTION OF THE PREFERRED EMBODIMENTS (Ink)

Figure 1:
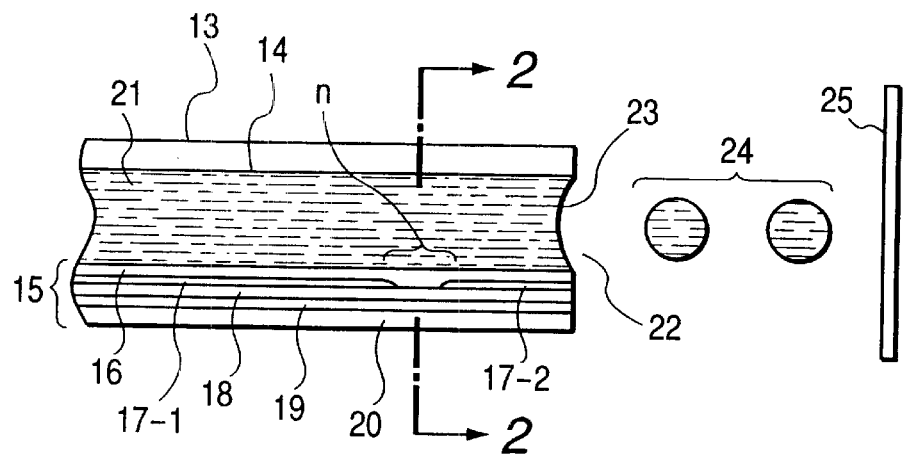
FIG. 1 is a longitudinal sectional view illustrating an embodiment of a head of the ink-jet recording apparatus according to the present invention.

The ink which is preferred as an embodiment of the present invention comprises a water-soluble coloring material, bis-hydroxyethyl sulfone (BHES) and urea in an aqueous solvent.

(BHES and its addition amount)

BHES has a structure expressed by a structural formula (I) shown below and is commercially available BHES which is synthesized by the conventional method.

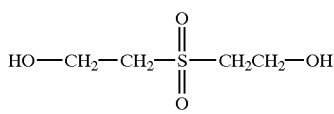

(I)

It is preferable that a content of BHES in the ink is, for example, 0.1 to 30 wt % relative to the whole weight of ink, preferably 1 to 20 wt %.

(Urea)

Commercially available urea which is synthesized by the conventional method is usable.

It is preferable a content of urea in the ink is, for example, 0.1 to 20 wt % of urea, preferably 0.1 to 15 wt % particular, relative to the whole weight of ink.

Furthermore, it is preferable that a total content of BHES and urea in the ink is 0.2 to 40 wt %, preferably 1 to 30 wt % in particular, relative to the whole weight of the ink. When the ink contains BHES and urea in amounts within ranges specified above, the ink can exhibit one of the effects of the present invention, that is, redischargeability which is less dependent on environments for use and excellent even when a diameter of a discharging nozzle is reduced. Furthermore, the contents of BHES and urea within the ranges specified above makes it possible to reduce dryness of an image to a negligible level when it is recorded on a paper by the ink-jet method.

(Content of a water-soluble organic solvent in ink)

A content of the water-soluble organic solvent mentioned above. is generally within a range of 0 to 50 wt %, preferably 2 to 45 wt %, relative to the whole weight of the ink. A water-soluble organic solvent may be used alone or as a mixture when a medium such as that mentioned above is used in combination, and preferable water-soluble organic solvents are monovalent alcohols, ketone, glycerin, ethylene glycol, diethylene glycol, triethylene glycol, tetraethylene glycol, thiodiglycol, propylene glycol, dipropylene glycol and derivatives thereof (alkyl ethers, in particular). Furthermore, various kinds of anti-foaming agents, viscosity modifiers, surface-tension modifiers, pH modifiers or the like can be added to the ink according to the present invention if necessary.

(Dye)

Usable as water-soluble coloring materials are conventionally known water-soluble dyes, for example, water-soluble anionic dyes, direct dyes, acidic dyes and reactive dyes.

(Concrete examples of water-soluble dye)

Mentioned below are examples of dyes which are usable as water-soluble dyes which contain anionic groups.

(Black ink)

Dyes which are usable in a black ink are, for example, C.I. direct black 17, C.I. direct black 19, C.I. direct black 22, C.I. direct black 31, C.I. direct black 32, C.I. direct black 51, C.I. direct black 62, C.I. direct black 71, C.I. direct black 74, C.I. direct black 112, C.I. direct black 113, C.I. direct black 154, C.I. direct black 168, C.I. acid black 2. C.I. acid black 48, C.I. acid black 51, C.I. acid black 52, C.I. acid black 110, C.I. acid black 115, C.I. acid black 156, C.I. reactive black 1, C.I. reactive black 8, C.I. reactive black 12, C.I. reactive black 13, C.I. food black 1 and C.I. food black 2.

(Yellow ink)

Dyes which are usable in a yellow ink are, for example, C.I. acid yellow 11, C.I. acid yellow 17, C.I. acid yellow 23, C.I. acid yellow 25, C.I. acid yellow 29, C.I. acid yellow 42, C.I. acid yellow 49, C.I. acid yellow 61, C.I. acid yellow 71, C.I. direct yellow 12, C.I. direct yellow 24, C.I. direct yellow 26, C.I. direct yellow 44, C.I. direct yellow 86, C.I. direct yellow 87, C.I. direct yellow 98, C.I. direct yellow 100, C.I. direct yellow 130, and C.I. direct yellow 142.

(Magenta ink)

Dyes which are usable in a magenta ink are, for example, C.I. acid red 1, C.I. acid red 6, C.I. acid red 8, C.I. acid red 32, C.I. acid red 35, C.I. acid red 37, C.I. acid red 51, C.I. acid red 52, C.I. acid red 80, C.I. acid red 85, C.I. acid red 87, C.I. acid red 92, C.I. acid red 94, C.I. acid red 115, C.I. acid red 180, C.I. acid red 254, C.I. acid red 256, C.I. acid red 289, C.I. acid red 315, C.I. acid red 317, C.I. direct red 1, C.I. direct red 4, C.I. direct red 13, C.I. direct red 17, C.I. direct red 23, C.I. direct red 28, C.I. direct red 31, C.I. direct red 62, C.I. direct red 79, C.I. direct red 81, C.I. direct red 83, C.I. direct red 89, C.I. direct red 227, C.I. direct red 240, C.I. direct red 242 and C.I. direct red 243.

(Cyan ink)

Dyes which are usable in a cyan ink are, for example, C.I. acid blue 9, C.I. acid blue 22, C.I. acid blue 40. C.I. acid blue 59, C.I. acid blue 93, C.I. acid blue 102, C.I. acid blue 104, C.I. acid blue 113, C.I. acid blue 117, C.I. acid blue 120, C.I. acid blue 167, C.I. acid blue 229, C.I. acid blue 234, C.I. acid blue 254, C.I. direct blue 6, C.I. direct blue 22, C.I. direct blue 25, C.I. direct blue 71, C.I. direct blue 78, C.I. direct blue 86, C.I. direct blue 90, C.I. direct blue 106 and C.I. direct blue 199.

A dye which has one or more —COOM group (M represents an alkaline metal, ammonium or organic ammonium) in a molecule is another example of preferably usable water-soluble dye. Speaking concretely, there can be mentioned dyes which are expressed by the following general formulas (II) through (V):

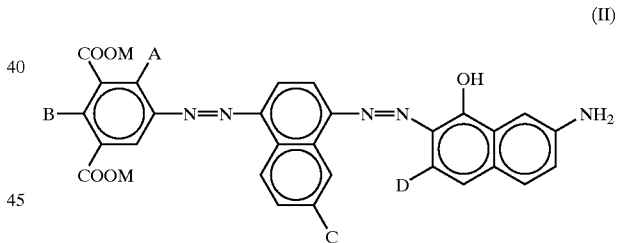

(II)

[wherein the reference symbols A and B represent hydroxyl groups or hydrogen atoms, the reference symbol C designates a hydrogen atom or $SO_3M$ and the reference symbol D denotes $SO_3M$.]

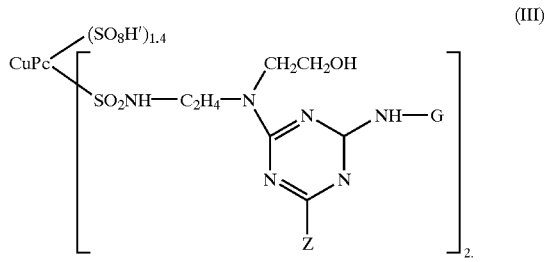

(III)

[wherein the reference symbol G represents a group which is expressed by any one of the following structural formulae (1) through (4):]

 (1)

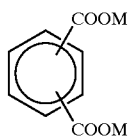 (2)

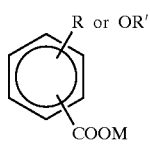 (3)

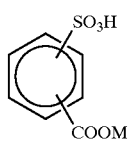 (4)

The reference symbol Z represents NHCH$_2$CH$_2$OH, N(CH$_2$CH$_2$OH)$_2$ or the like, and the reference symbol R or R' used in the structural formulae (1) through (4) designate H, a lower alkyl group or the like.

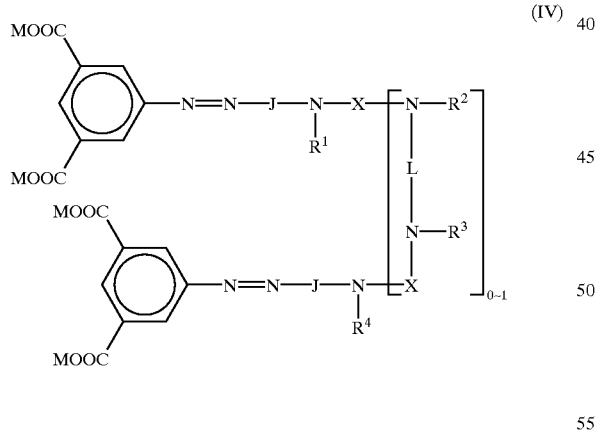 (IV)

[wherein the reference symbol J represents a group which is expressed by any one of the following structural formulae (5) through (7):]

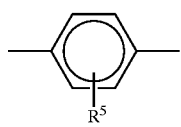 (5)

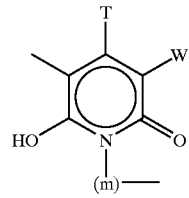 (6)

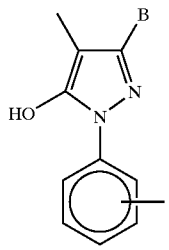 (7)

The reference symbol L represents the following structural formula (8) or (9):

—CH$_2$CH$_2$— (8)

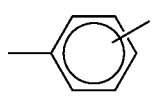 (9)

The reference symbol X represents a group which is expressed by any one of the following structural formulae (10) through (12):

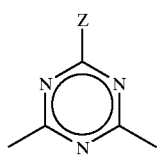 (10)

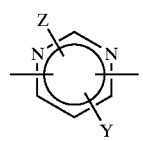 (11)

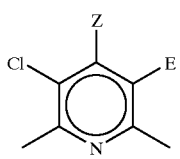 (12)

The reference symbols R$^1$ through R$^4$ represent —H, a lower alkyl group or the like. In the structural formulae (5) through (12) mentioned above, a reference symbol B represents —H or —COOH, a reference symbol W designates —H, —CN, an amide group, a pyridinium group or —COOH, a reference symbol m denotes a number of 2 to 8, a reference symbol Z represents an alkoxy group, —OH, an alkylamino group, —NH$_2$ or the like, the reference symbol Y designates —H, —Cl or —CN, the reference symbol E denotes —Cl or —CN and the reference symbol R$^5$ represents —H, a lower alkyl group or the like.

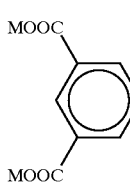
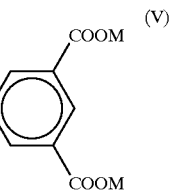

(V)

MOOC—⟨ring⟩—N=N—J—X—(NR¹—L—NR²—X)ₙ—J—N=N—⟨ring⟩—COOM with MOOC and COOM substituents

[wherein the reference symbol J represents the following structural formula (13):]

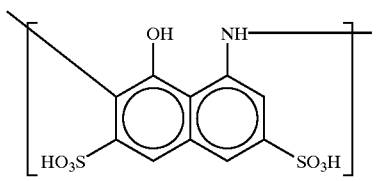

(13)

The reference symbol L represents the following structural formula (14) or (15):

—$CH_2CH_2$— (14)

(15)

The reference symbol X designates any one of the following structural formulae (16) through (18):

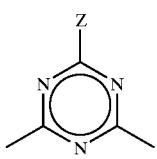

(16)

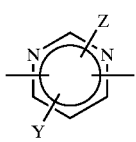

(17)

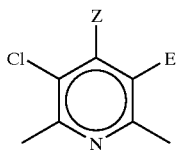

(18)

The reference symbol $R^1$ or $R^2$ denotes —H or a lower alkyl group, and in the structural formulae (14) through (18) mentioned above, the reference symbol Z represents an alkoxy group, —OH, alkylamino group, —$NH_2$ or the like, the reference symbol Y designates —H, —Cl or —CN and the reference symbol E denotes —Cl or —CN.

(Content of dye)

Though a content of the water-soluble dye in the ink is not limited in particular, a content of the water-soluble dye of 0.1 to 15 wt %, within a range of 1 to 10 wt % in particular, relative to the whole weight of the ink as standard is preferable since such a content makes it possible to record an image at a sufficient density and prevent a viscosity of the ink from deviating out of a range where the ink can normally be discharged by the ink-jet recording method.

(Aqueous medium)

The aqueous medium is used to maintain the BHES, urea and the water-soluble coloring material in a dissolved condition, thereby composing the ink. It is preferable that the aqueous medium contains at least water as an ingredient.

(Content of water)

It is preferable that a content of water relative to the whole weight of the ink is 20 to 95 wt % for example, 40 to 95 wt % in particular, preferably 60 to 95 wt %.

(Water-soluble organic solvent)

A water-soluble organic solvent may be contained in the aqueous medium. It is possible to enhance a solubility of each component of the ink and adjust a viscosity by using, for example, water-soluble organic solvents which are listed below. The water-soluble organic solvents are monovalent alcohols such as methanol, ethanol and isopropyl alcohol; ketones or keto-alcohols such as acetone and diacetone alcohol; ethers such as tetrahydrofuran and dioxane; addition polymers of oxyethylene or oxypropylene such as diethylene glycol, tryethylene glycol, tetraethylene glycol, dipropylene glycol, tripropylene glycol, polyethylene glycol and polypropylene glycol; alkylene glycols having an alkylene group containing 2 to 6 carbon atoms such as ethylene glycol, propylene glycol, trimethylene glycol, buthylene glycol and hexylene glycol; triols such as 1,2,6-hexane triol; thiodiglycol; glycerine; lower alkyl ethers of polyalcohols such as ethylene glycol monomethyl (or ethyl) ether, diethylene glycol monomethyl (or ethyl) ether and triethylene glycol monomethyl (or ethyl) ether; lower dialkyl ethers of polyalcohols such as triethylene glycol dimethyl (or ethyl) ether and tetraethylene glycol dimethyl (or ethyl) ether; sulfolane, N-methyl-2-pyrrolidone, 2-pyrrolidone, and 1,3-dimethyl-2-imidazolidinone.

(Content of water-soluble organic solvent)

A content of the water-soluble organic solvent is, for example, within a range of 1 to 30 wt %, 1 to 20 wt % in particular, relative to the whole weight of the ink.

(Application of ink to ink-jet recording method)

The ink described above is used preferably in particular for the ink-jet recording method which discharges the ink through a nozzle to a recording medium by a heat energy or a mechanical energy and, needless to say, applicable not only to other recording method but also general writing implements.

When it is desired to make the ink especially suited for the ink-jet recording, blending ratios among components of the ink selected from among the materials mentioned above are adjusted at a blending stage so that the ink has a surface tension of 30 to 68 dyn/cm at and a viscosity not exceeding 15 cP, 10 cP in particular, more preferably 5 cP at an ink temperature of 25° C., whereby the ink has an ink-jet discharging characteristic which is suited especially for recording a high quality image. Ink obtained in Examples 1 through 7 described later, for example, can be mentioned as ink having concrete composition to achieve such characteristics.

(Apparatus)

It will be described below that ink jet recording apparatus that can use said ink and image recording method thereby.

(Configuration of ink head)

Figure 2:
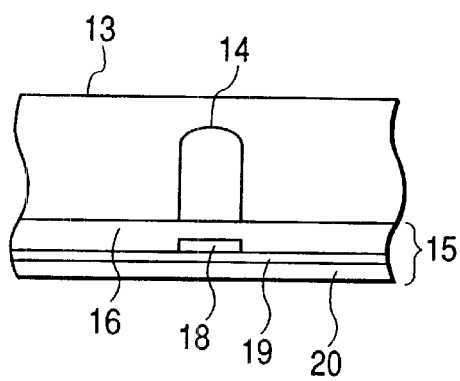
FIG. 2 is a sectional view taken along a 2—2 line in FIG. 1.

FIG. 1 is a schematic sectional view taken in a longitudinal direction of an orifice in an embodiment of a head, one of main components of an ink-jet recording apparatus of a type which discharges ink utilizing a heat energy. Furthermore, FIG. 2 is a sectional view taken along a 2—2 line in FIG. 1. In FIGS. 1 and 2, a head 13 is obtained by cementing a glass, ceramic or plastic sheet or the like which has an ink passing slot 14 to an exothermic head 15 (shown head is not limitative). The exothermic head 15 consists of a protective film 16 made of silicon oxide or the like, aluminium electrodes 17-1 and 17-2, an exothermic resistor layer 18 made of an nickel-chrome alloy or the like, a heat accumulating layer 19 and a substrate 20 made of alumina or the like having a high heat dissipating property. An ink 21 has attained to an orifice (thin slot) 22 and forms a meniscus 23 under a predetermined pressure P. When electric signals are applied to the electrodes 17-1 and 17-2, a region of the exothermic head 15 which is indicated by a reference symbol n abruptly dissipates heat, whereby the ink 21 which is in contact with this region is foamed, the meniscus 23 protrudes under a pressure, the ink 21 is foamed is discharged from the orifice 22, injected toward a recording medium 25 (for example, a paper) and adheres to an image recording area of the recording medium to form an image.

Figure 3:
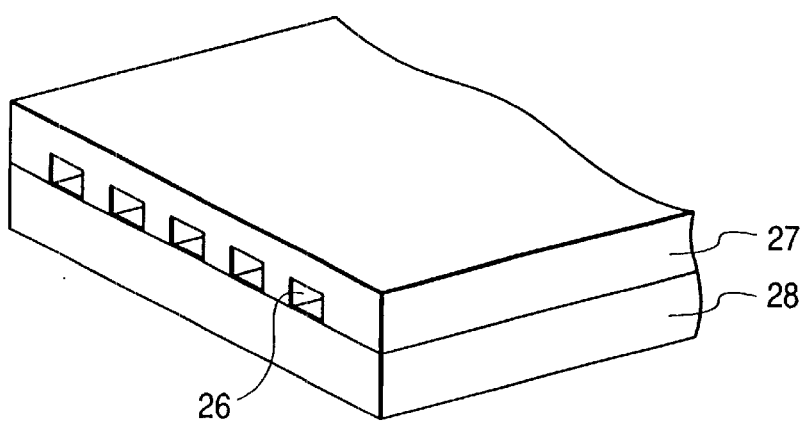
FIG. 3 is a schematic diagram descriptive of multiple heads.

FIG. 3 is an external appearance of a multi-head consisting of a large number of heads arranged in parallel with one another. The multi-head is composed by bringing a glass plate 27 having multiple grooves 26 into contact with an exothermic head 28 similar to that described with reference to FIG. 1.

A size of the orifice in the head having the configuration described above is not restricted in particular and may be selected adequately dependently on a desired image quality. However, it has been examined to reduce a size of an orifice in the recent years when there has been demands for higher image qualities. Speaking concretely, there has been examined to reduce a size of an orifice so that ink is discharged from the orifice in an amount of 0.1 to 40 picoliters (pl), 0.1 to 30 pl in particular, more preferably 1 to 15 pc by a single discharging operation. One of the technical targets which is preferable in particular for an orifice having such a size is to stably redischarge ink after a pause of recording. The ink preferred as the embodiments of the present invention can be mentioned as one of the technical means extremely effective to reach the technical target.

Even when the size of an orifice is not finely reduced, under various environments for use of ink-jet recording apparatus along with its prevalence or in a concrete case where it is used in an environment in which ambient temperature is 5° C. or lower (for example, in a room which is not heated or outdoors in a cold district), ink may not be discharged due to choking of the orifice as described before and it is one of the important technical targets to overcome from the viewpoint of more prevalence of ink-jet recording apparatus. The ink preferred as the embodiments can be mentioned as one of technical means effective to attain to this technical target.

(Ink-jet recording apparatus)

Figure 4:
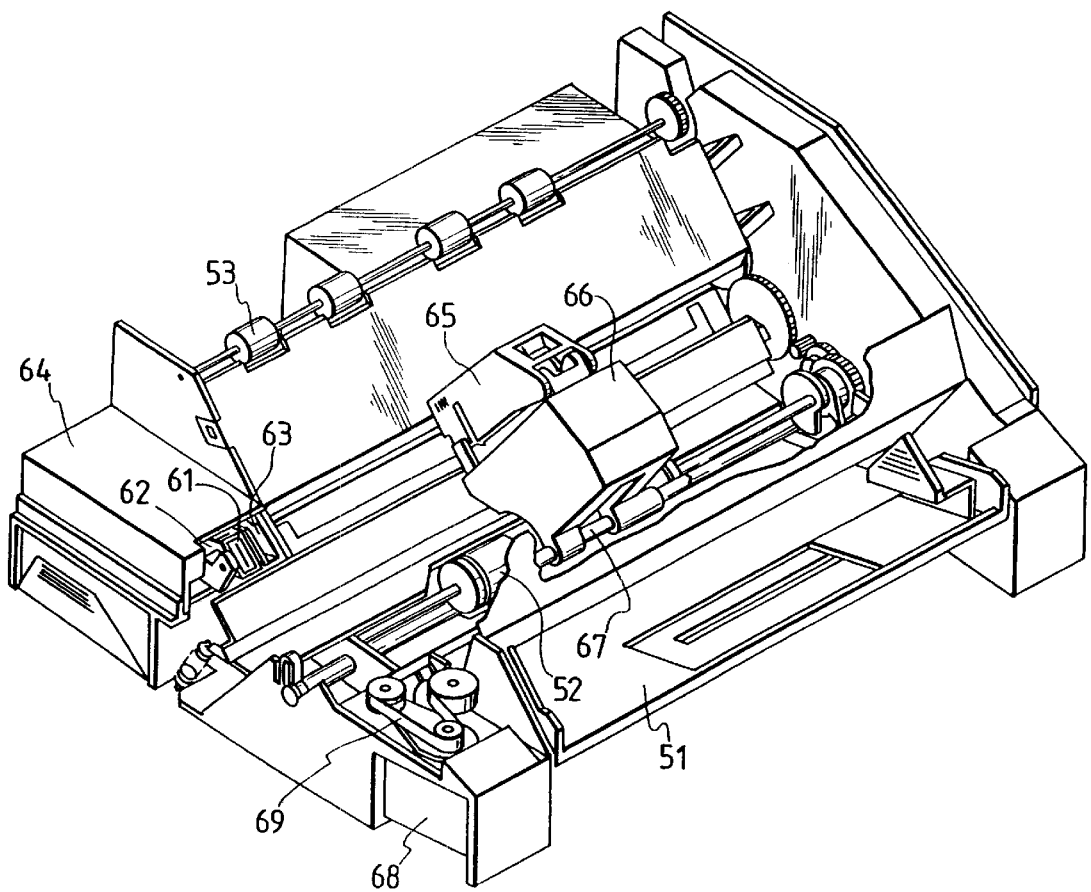
FIG. 4 is a schematic perspective view showing an embodiment of the ink-jet recording apparatus according to the present invention.

FIG. 4 shows an ink-jet recording apparatus in which the recording head described above is built. In FIG. 4, a reference numeral 61 is a blade which functions as a wiping member, and an end of the blade is sustained by a blade holding member so as to form a fixed end functioning as a cantilever. The blade 61 is disposed at a location adjacent to a recording area in which an image is to be recorded by the recording head and sustained in a condition where it protrudes into a moving path for the recording head. A reference numeral 62 represents a cap which is disposed at a home position adjacent to the blade 61 and configured to move in a direction perpendicular to a moving direction of the recording head until it comes into contact with a discharge port surface and caps it. Furthermore, a reference numeral 63 designates an absorbing body which is disposed adjacent to the blade 61 and sustained, like the blade 61, in a condition where it protrudes into the moving path for the recording head The blade 61, cap 62 and the absorbing body 63 described above compose a discharge restoring section 64, and moisture, dust or the like are removed from the ink discharge port surface by the blade 61, and the absorbing body 63. A reference numeral 65 denotes the recording head which has discharging energy generating means and performs recording by discharging ink to a cloth opposed to the discharge port surface in which a discharge port is formed, and reference numeral 66 represents a carriage which mounts and moves the recording head 65. The carriage 66 is slidably engaged with a guide axis 67 and a portion of the carriage 66 is connected to a belt 69 (not shown) which is driven by a motor 68. Accordingly, the carriage 66 is movable along the guide axis 67, and make the recording head 65 move in the recording area and an area adjacent thereto. Reference numeral 51 represents a paper feeder which is used for inserting a paper and reference numeral 52 designates a paper feeding roller which is driven by a motor (not shown). The ink-jet recording apparatus which is configured as described above feeds the paper to a location opposed to the discharge port surface of the recording head and discharges the paper into a paper discharger in which a cloth discharging roller 53 is arranged.

In the configuration described above, the cap 62 of the discharge restoring 64 is retreated from the moving path for the recording head 65, but the blade 61 protrudes into the moving path when the recording head 65 returns to the home position upon completion of recording. As a result, the discharge port surface of the recording head 65 is wiped. In addition, the cap 62 moves so as to protrudes into the moving path for the recording head when the cap 62 is to be brought into contact with the discharging surface of the recording head 65 for capping.

While the recording head 65 moved from the home position to a recording start position, the cap 62 and the blade 61 are positioned at locations which are the same as those at the wiping stage. As a result, the discharge port surface of the recording head 65 is wiped also during the movement. The recording head moves to the home position not only upon the completion of recording and for restoring discharge. While the recording head moves within the recording area for recording, it also moves at predetermined intervals to the home position adjacent to the recording area, thereby performing the wiping.

(Ink cartridge)

Figure 5:
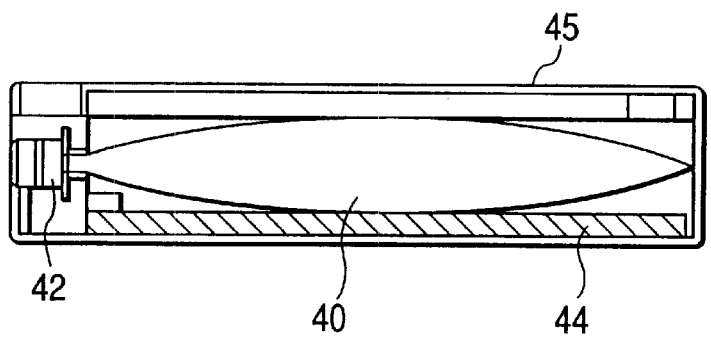
FIG. 5 is a longitudinal sectional view illustrating an embodiment of the ink cartridge.

FIG. 5 exemplifies an ink cartridge which accommodates ink to be supplied, for example, through a tube. In FIG. 5, reference numeral 40 represents an ink housing section, for example an ink bag, which accommodates ink to be supplied and a rubber stopper 42 is disposed in a tip of the ink housing 40. When a needle (not shown) is inserted through the stopper 42, the ink in the ink bag 40 can be supplied to the recording head. A reference numeral 44 designates an absorbing body which accepts waste ink. It is preferable to use an ink housing which has an ink-contact surface made of polyolefin, polyethylene in particular, for the recording head according to the present invention. Not only the recording head which has a separate ink cartridge as described above but also a recording head which is integrated with an ink cartridge as shown in FIG. 6 is preferably usable with the ink-jet recording apparatus according to the present invention.

(Recording unit)

Figure 6:
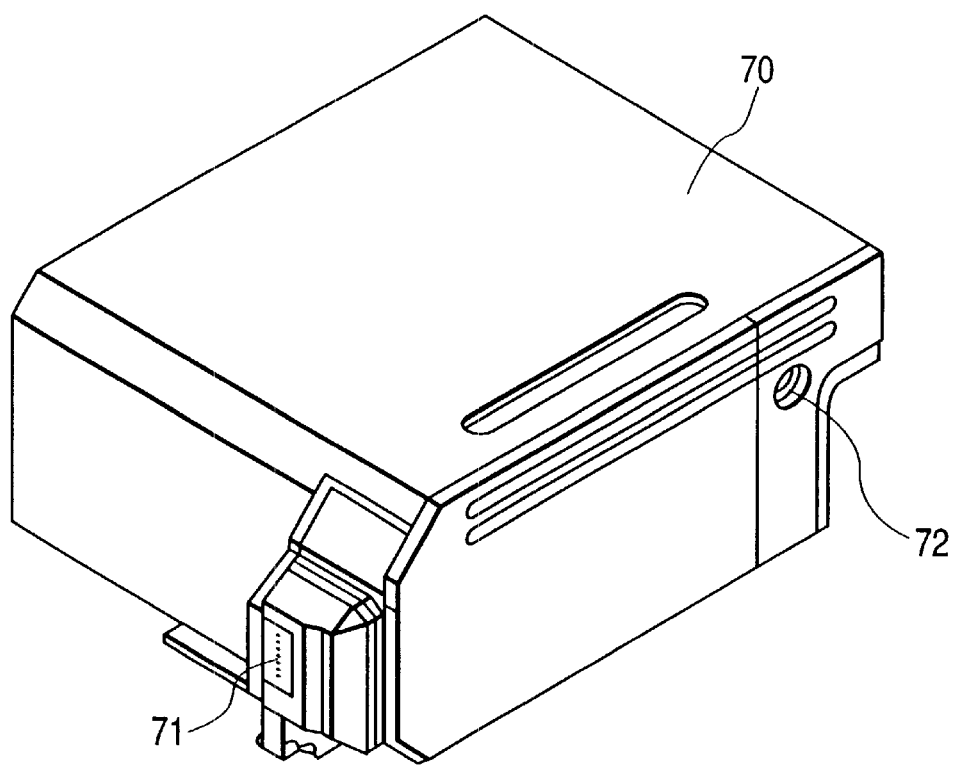
FIG. 6 is a schematic perspective view exemplifying another configuration of the head of the ink-jet recording apparatus.

In FIG. 6, reference numeral 70 denotes a recording unit which accommodates, for example an ink absorbing body, which accommodates ink to be discharged as ink drops from a head portion 71 having a plurality of orifices. For the ink-jet recording apparatus according to the present invention, it is preferable to use polyurethane as a material of the ink absorbing body. Reference numeral 72 denotes an atmosphere vent for communicating an interior of the recording unit with atmosphere. The recording unit 70 is to be used in place of the recording head shown in FIG. 4, and is freely attachable and detachable to and from the carriage 66.

(Ink set)

Figure 7:
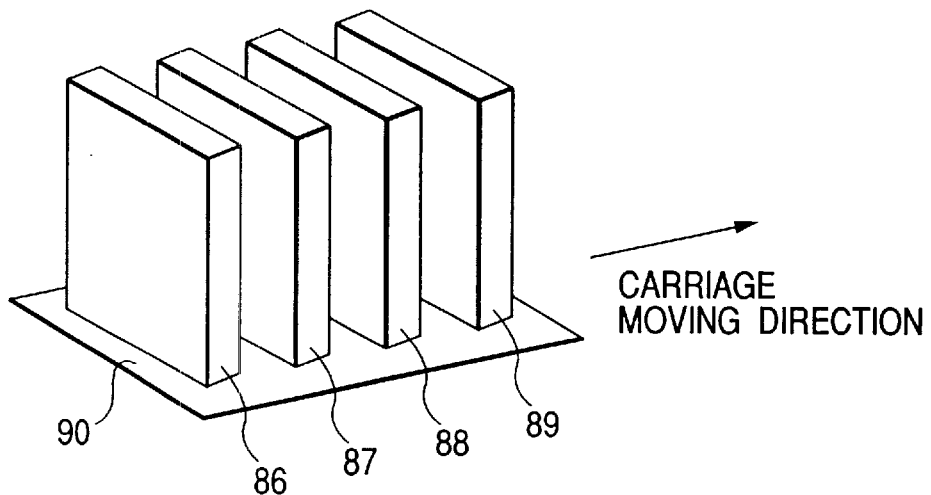
FIG. 7 is a schematic diagram descriptive of a recording head that four ink cartridges are mounted.

The ink preferred as the embodiments described above can be yellow inks, magenta inks, cyan inks, red inks, green inks, blue inks or black inks dependently on selection of coloring materials. Each kind of ink may be used alone for recording an image. Alternately, it is possible to combine two or more kinds of ink having different colors as ink sets which are preferably usable for forming color images.

which uses the four recording heads, this example is not limitative and it is considered to use four ink cartridges of four colors in a single head and ink flow paths are separated from one another for recording a color image as shown in FIG. 7.

Description has been made above of the embodiments wherein the apparatus which exerts a heat energy to ink and discharges the ink by the heat energy, and the ink according to the present invention is used by the image recording methods which use the recording apparatus. However, the ink according to the present invention is usable for the ink-jet recording apparatus which is of a type to discharge ink by mechanical energies and image recording methods which use such ink-jet recording apparatus, thereby obtaining similar excellent effects.

The present invention will be described in more detail with reference to several concrete examples which are not limitative of the present invention.

Examples 1 through 7 and Comparative Examples 1 through 7

In Examples 1 through 7 and Comparative examples 1 through 7, ink is prepared by mixing components listed in Table 1 shown below, stirring them for 2 hours or longer, adjusting pH to 7 using a 10% aqueous solution of sodium hydroxide and filtrating them with a 0.2 $\mu$m membrane filter.

TABLE 1

|  | Coloring material | BHES | Urea | Solvent |
| --- | --- | --- | --- | --- |
| Example 1 | CI direct yellow 86: 2 wt % | 5 wt % | 5 wt % | Diethylene glycol: 5 wt %, water: rest part |
| Example 2 | CI food black 2: 3 wt % | 10 wt % | 10 wt % | Water: rest part |
| Example 3 | CI direct blue 199: 2.5 wt % | 10 wt % | 5 wt % | Water: rest part |
| Example 4 | CI direct black 154: 2 wt % | 5 wt % | 10 wt % | Diethylene glycol: 5 wt %, water: rest part |
| Example 5 | CI food black 2: 3 wt % | 20 wt % | 12 wt % | Water: rest part |
| Example 6 | CI acid red 289: 2 wt % | 15 wt % | 5 wt % | Water: rest part |
| Example 7 | CI direct blue 86: 2.5 wt % | 5 wt % | 3 wt % | Water: rest part |
| Comparative example 1 | CI direct yellow 86: 2 wt % | 0 | 0 | Glycerine: 16 wt %, water: rest part |
| Comparative example 2 | CI food black 2: 3 wt % | 0 | 0 | Tryethylene glycol: 12 wt %, water: rest part |
| Comparative example 3 | CI direct blue 199: 2.5 wt % | 0 | 0 | Diethylene glycol: 14 wt %, water: rest part |
| Comparative example 4 | CI direct black 154: 2 wt % | 0 | 0 | Polyethylene glycol 300: 14 wt %, water: rest part |
| Comparative example 5 | CI food black 2: 3 wt % | 0 | 0 | Ethylene glycol: 15 wt %, water: rest part |
| Comparative example 6 | CI direct yellow 86: 2 wt % | 10 wt % | 0 | Water: rest part |
| Comparative example 7 | CI food black 2: 3 wt % | 0 | 5 wt % | Diethylene glycol: 3 wt %, water: rest |

Figure 8:
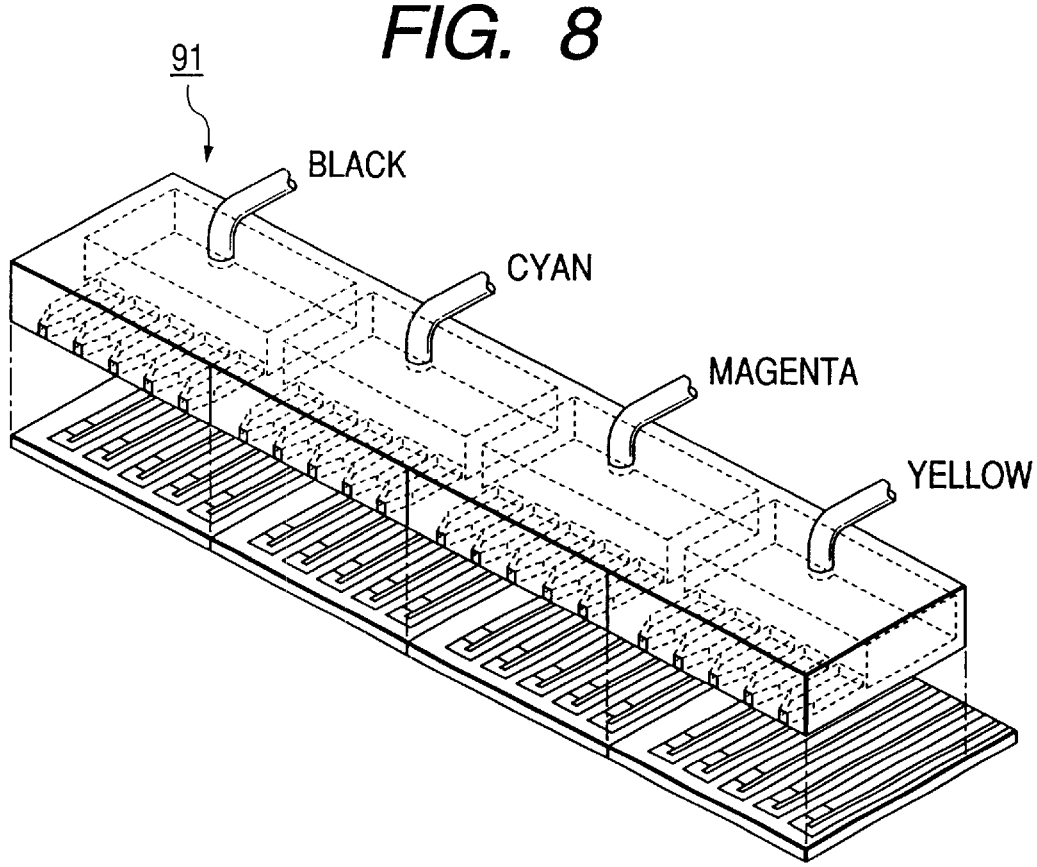
FIG. 8 is a schematic diagram descriptive of a configuration wherein four recording heads are arranged on a carriage.

Furthermore, ink sets which are preferably usable for forming images of high grades are obtainable by combining two or more kinds of ink which have the same color but contain different coloring materials or combining two or more kinds of ink which have the same color but different concentrations. For forming images using these ink sets, it is possible to use a recording apparatus having a carriage on which the recording head shown in FIG. 3, for example, is arranged in a number of four. An embodiment of such a recording apparatus is shown in FIG. 8, wherein reference numerals 86, 87, 88 and 89 represent recording heads which are to discharge, for example, yellow, magenta, cyan and black inks respectively. These recording heads are disposed in the recording apparatus described above and discharge the ink of different colors in accordance with the recording signals. Though FIG. 8 shows an example of recording apparatus

[Evaluation 1]

Using an ink-jet printer (trade name: BJ130 manufactured by Canon Ltd.) which utilized an exothermic element as a discharging energy source, recording was performed on a commercially available plain paper at a driving frequency of 2 kHz with each kind of the ink described above, whereafter the ink was evaluated for a clogging characteristic and frequency response after a pause of printing. The printer used had a head which was configured to discharge approximately 60 pl of ink from an orifice by a single discharging operation. Evaluating conditions were set as described below:

(1) Clogging characteristic after a pause of printing

After charging each kind of ink into the printer and printing alphanumerics continuously for one minute at a room temperature of 0° C. and a humidity of 25±5%, the printing was paused for 30 seconds and alphanumerics which were printed after the pause were checked for defects such as blurring and blank areas. The recording head was at a temperature of 35° C.

A: First and subsequent alphanumerics were not blurred.

B: First alphanumeric was partially blurred or had blank areas.

C: First alphanumeric was not printed at all.

(2) Frequency response

Obtained prints were evaluated by visually checking them for printed conditions, that is, blurring, blanking, and ink dots at improper positions on the recording medium caused by splash or twisting.

AA: Ink followed frequency properly, and solid and character prints were free from blurring, blanking and improper ink dot position.

A: Ink followed frequency nearly properly, character prints were free from blanking and improper ink dot position, but solid prints were slightly blurred.

B: Character prints were free from blurring and blanking, but had some improper ink dot positions. ⅓ of solid prints were blurred and blanked.

C: Most of solid prints were blurred and blanked. A large number of character prints were blurred and had improper ink dot positions.

[Evaluation 2]

An ink-jet head which utilized an exothermic element as an ink discharging energy was prepared. This head was configured to discharge 10 pl of ink through an orifice by a single discharging operation. Using this head, recording was effected on a copying paper which was the same as that used for the evaluation 1 at a driving frequency of 5 kHz. Prints obtained after a pause of printing were evaluated for the clogging characteristic and the frequency response characteristic of the orifice. Evaluating conditions were the same as those for the evaluation 1, except for the room temperature, which was set at 20° C. The evaluation standard was also the same as that for the evaluation 1.

Results obtained by the evaluation 1 and the evaluation 2 are summarized in following Tables 2 and 3:

[Evaluation 1]

TABLE 2

|  | Clogging characteristic after pause of printing | Frequency characteristic |
| --- | --- | --- |
| Example 1 | A | A |
| Example 2 | A | A |
| Example 3 | A | A |
| Example 4 | A | A |
| Example 5 | A | A |
| Example 6 | A | A |
| Example 7 | A | A |
| Comparative example 1 | C | C |
| Comparative example 2 | C | C |
| Comparative example 3 | C | C |
| Comparative example 4 | C | C |
| Comparative example 5 | C | C |

TABLE 2-continued

|  | Clogging characteristic after pause of printing | Frequency characteristic |
| --- | --- | --- |
| Comparative example 6 | C | A |
| Comparative example 7 | B | C |

[Evaluation 2]

TABLE 3

|  | Clogging characteristic after pause of printing | Frequency characteristic |
| --- | --- | --- |
| Example 1 | A | A |
| Example 2 | A | A |
| Example 3 | A | A |
| Example 4 | A | A |
| Example 5 | A | A |
| Example 6 | A | A |
| Example 7 | A | A |
| Comparative example 1 | C | C |
| Comparative example 2 | C | C |
| Comparative example 3 | C | C |
| Comparative example 4 | C | C |
| Comparative example 5 | C | C |
| Comparative example 6 | C | B |
| Comparative example 7 | C | B |

These embodiments of the present invention according to the present invention provides effects which are exemplified below:

(1) To stabilize redischarge of aqueous ink which contains water-soluble coloring material in diversified environments for recording or even when a diameter of an orifice is reduced.

(2) To stably record a highly minute image.

(3) To enable to obtain a highly minute image.

(4) To meet requisites for ink to be used for ink-jet recording, thereby enabling to perform highly reliable ink-jet recording even in a cold district or the like and assure a high reliability for rerecording after a pause even when a recording head for highly minute image is used.

What is claimed is:

1. An image recording method comprising the steps of:
providing an image recording apparatus comprising
a) a recording unit provided with
i) an ink housing section containing an ink,
ii) a recording head for ejecting the ink from an orifice to a recording medium, and
iii) means for supplying the ink from the ink housing section to the recording head; and
b) means for operating the recording head to eject the ink to a recording medium in response to a recording signal; and
operating said image recording apparatus, discharging the ink from an orifice and adhering the ink to an image recording region on a recording medium,
wherein the ink contains a water-soluble coloring material, bis-hydroxyethyl sulfone and urea in an aqueous medium, and wherein the orifice has a size capable of ejecting 0.1 to 40 picoliters of an ink with one ejection operation.

2. An image recording apparatus comprising
a) a recording unit provided with
   i) an ink housing section containing an ink,
   ii) a recording head for ejecting an ink from an orifice to a recording medium, and
   iii) means for supplying the ink in the ink housing section to the recording head; and
b) means for allowing said recording unit to eject the ink in response to a recording signal,
wherein the ink contains a water-soluble coloring material, bis-hydroxyethyl sulfone and urea in an aqueous medium, and the orifice has a size capable of ejecting 0.1 to 40 picoliters of an ink with one ejection operation.

3. A recording unit comprising:
an ink housing section containing an ink which contains a water-soluble coloring material, bis-hydroxyethyl sulfone and urea in an aqueous medium;
a recording head for discharging said recording ink from an orifice to a recording medium; and
means for supplying said ink in the ink housing section to said recording head,
wherein said orifice has a size capable of discharging 0.1 to 40 picoliters of ink with a single discharging operation.

* * * * *

UNITED STATES PATENT AND TRADEMARK OFFICE
CERTIFICATE OF CORRECTION

PATENT NO. : 6,474,803 B1
DATED : November 5, 2002
INVENTOR(S) : Koromo Shirota et al.

It is certified that error appears in the above-identified patent and that said Letters Patent is hereby corrected as shown below:

<u>Title page,</u>
Item [56], References Cited, FOREIGN PATENT DOCUMENTS,
"JP      10095107    *    4/1998" should read -- JP      10-095107    *    4/1998 --.
Item [57], ABSTRACT,
Line 1, "can be rarely not discharged" should read -- is unlikely to undergo discharge failure --.

<u>Column 1,</u>
Line 18, "the recent" should read -- recent --;
Line 37, "facilitates" should read -- makes it easy --;
Line 40, "main" should read -- the main --;
Line 41, "preferable" should read -- the preferable --;
Line 48, "reserch" should read -- research --; and
Line 50, "for a" should read -- for --.

<u>Column 2,</u>
Line 18, "makes difficulty" should read -- causes problems -- and "conspicuous" should read -- that are conspicuous --;
Line 19, "placed" should read -- is placed --;
Line 21, "whose orifices" should read -- orifices whose --;
Line 26, "can rarely be not redischarged" should read -- rarely undergoes redischarge failure --;
Line 27, "recording" should read -- recording, -- and "environment" should read -- environments --;
Line 46, "sulfon" should read -- sulfone -- and "wrea." should read -- urea. --; and
Lines 47, 53 and 62, "further" should read -- a further --.

<u>Column 3,</u>
Lines 3, 8, 20 and 38, "further" should read -- a further --;
Line 50, "still" should read -- a still --;
Line 60, "makes" should read -- make -- and "stable" should read -- provide stable --; and
Line 66, "wax like" should read -- wax-like --.

UNITED STATES PATENT AND TRADEMARK OFFICE
CERTIFICATE OF CORRECTION

PATENT NO.    : 6,474,803 B1
DATED         : November 5, 2002
INVENTOR(S)   : Koromo Shirota et al.

It is certified that error appears in the above-identified patent and that said Letters Patent is hereby corrected as shown below:

Column 4,
Line 16, "Further" should read -- Further, --;
Line 26, "Above-mentioned" should read -- The above-mentioned --;
Line 27, "disclosed," should read -- disclosed; --; and
Line 51, "that" should read -- on which --.

Column 5,
Line 15, "preferable" should read -- preferable that --;
Line 16, "particular," should read -- in particular, --; and
Line 32, "above." should read -- above --.

Column 6,
Line 22, "40." should read -- 40, --.

Column 10,
Line 54, "method" should read -- methods --.

Column 11,
Line 2, "It will be described below that" should read -- An --;
Line 3, "thereby." should read -- will be described below. --;
Line 7, "main" should read -- the main --;
Line 25, "21" should read -- 21 which --;
Line 37, "adequately dependently on a" should read -- appropriately, depending on the --;
Line 38, "examined" should read -- investigated --;
Line 39, "the recent" should read -- recent -- and "has" should read -- have --;
Lines 40-41, "there has been examined" should read -- it has been investigated --;
Line 43, "15 pc" should read -- 15 pl --;
Line 55, "heated" should read -- heated, --; and
Line 60, "technical" should read -- the technical --.

UNITED STATES PATENT AND TRADEMARK OFFICE
CERTIFICATE OF CORRECTION

PATENT NO. : 6,474,803 B1
DATED : November 5, 2002
INVENTOR(S) : Koromo Shirota et al.

It is certified that error appears in the above-identified patent and that said Letters Patent is hereby corrected as shown below:

Column 12,
Line 26, "make" should read -- makes --;
Line 37, "restoring" should read -- restoring section --;
Line 42, "protrudes" should read -- protrude --; and
Line 46, "moved" should read -- moves --.

Column 13,
Line 26, "Alternately," should read -- Alternatively, --.

Column 14,
Line 41, "Tryethylene" should read -- Triethylene --.

Column 16,
Line 36, "provides" should read -- provide --.

Signed and Sealed this

Ninth Day of September, 2003

JAMES E. ROGAN
*Director of the United States Patent and Trademark Office*